United States Patent [19]
Peterson et al.

[11] Patent Number: 5,613,209
[45] Date of Patent: Mar. 18, 1997

[54] METHOD AND APPARATUS FOR AUTOMATICALLY SELECTING A RADIO TALKGROUP

[75] Inventors: Larry M. Peterson, West Dundee; Timothy J. Sherburne, Rolling Meadows, both of Ill.

[73] Assignee: Motorola, Inc., Schaumburg, Ill.

[21] Appl. No.: 299,134

[22] Filed: Sep. 2, 1994

[51] Int. Cl.$^6$ .................. H04Q 7/00; H04Q 9/00
[52] U.S. Cl. .............. 455/34.1; 455/33.2; 455/33.4; 455/54.1; 455/56.1
[58] Field of Search ............... 455/54.1, 54.2, 455/56.1, 49.1, 34.1, 34.2, 33.1, 33.4, 33.2, 17, 9; 342/357, 457; 340/825.47, 825.49, 825.54

[56] References Cited

U.S. PATENT DOCUMENTS

| | | | |
|---|---|---|---|
| 4,972,460 | 11/1990 | Sasuta | 379/60 |
| 5,117,501 | 5/1992 | Childress et al. | 455/11.1 |
| 5,214,789 | 5/1993 | George | 455/33.2 |
| 5,225,843 | 7/1993 | Thompson | 342/367 |
| 5,235,633 | 8/1993 | Dennison et al. | 379/60 |
| 5,279,521 | 1/1994 | Johlie et al. | 455/34.1 |
| 5,301,359 | 4/1994 | Van Den Heuvel et al. | 455/33.1 |

*Primary Examiner*—Reinhard J. Eisenzopf
*Assistant Examiner*—Gertrude Arthur
*Attorney, Agent, or Firm*—Andrew S. Fuller

[57] ABSTRACT

A communication system (100) has automatic selection of talkgroups based on geographically defined areas. The system (100)includes wireless two-way communication units (120) capable of communicating with each other within a coverage area 205. A particular communication unit 120 is automatically caused to operate as a member of a particular talkgroup when that particular communication unit (120) is within a particular area of operation (207), which particular area of operation (207) is smaller than, and contained within, the coverage area (205).

21 Claims, 5 Drawing Sheets

5,613,209

METHOD AND APPARATUS FOR AUTOMATICALLY SELECTING A RADIO TALKGROUP

TECHNICAL FIELD

This invention relates in general to radio communication systems, and in particular, to talkgroup affiliation for communication units of a communication system.

BACKGROUND OF THE INVENTION

Two-way wireless communication systems are known in the art. In many such systems, communication units are grouped in talkgroups, such that communications amongst members of a talkgroup are shared.

From time to time, a need exists to reorganize members of a system into a new talkgroup, frequently on a temporary basis. For example, when an emergency occurs, it is frequently desirable to regroup members of various public safety talkgroups into a new talkgroup that facilitates communications amongst those various public safety agencies.

In the past, to meet this need, some systems preprogram the communication units with the talkgroup information, and allow the communication unit operator to select the preprogrammed operating mode by physical manipulation of a selector switch. This is suitable in many instances, but is subject to the frailties of human error.

Another prior art approach allows the system infrastructure to transmit a reprogramming command to the communication units, to cause the communication units to utilize new talkgroup identifiers. To date, such regrouping commands, being transmitted throughout the effective coverage area of the system are responded to by all communication units belonging to the targeted talkgroups, hence causing all communication units within the system to become similarly regrouped. In some instances, this is appropriate. Other times, this leads to unnecessary regrouping and potential mishaps. On the one hand, some units that should be programmed, may miss the regrouping command, leading to potentially life and property threatening situations. On the other hand, communication units that are not necessary to the situation at hand, may be included in the regrouping command, again leading to potentially confusing situations.

Accordingly, a need exists for a way to accommodate the need to occasionally regroup communication units while at least substantially avoiding the concerns noted above.

DETAILED DESCRIPTION OF THE PREFERRED EMBODIMENT

Generally, a communication system is provided which includes a method and apparatus for automatically selecting a communication talkgroup. In the present invention, the communication system has a coverage which is divided into smaller geographically defined areas. A talkgroup is associated with one or more geographically defined areas. The communication system has communication units, each of which may have a selected talkgroup based on the present geographic location of the respective communication unit. Mobile communication units may travel between geographically defined areas of the coverage area and as a consequence, operate using talkgroup identification information associated with that particular geographically defined area.

Figure 1:
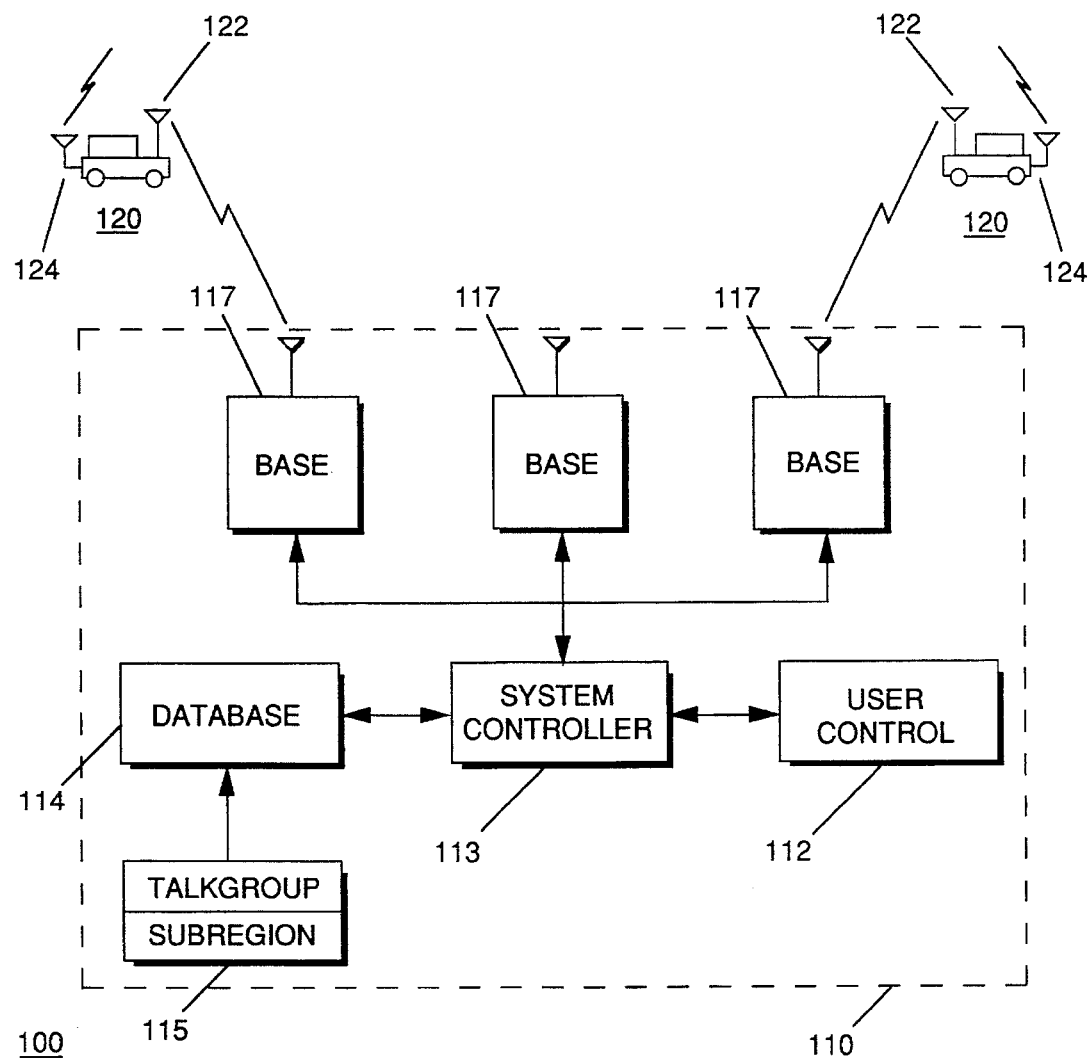
FIG. 1 is a block representation of a communication system, in accordance with the present invention.

Referring now to FIG. 1, a block representation of a radio communication system 100 is shown, in accordance with the present invention. The radio communication system 100 includes a system support infrastructure 110, which supports a particular coverage area, and communication units 120 which interface with the system support infrastructure 110. Each communication unit 120 includes a receiver 124 for receiving present location information, and a transceiver 122 for communicating with the system support infrastructure 110. The communication units 120 are mobile and travel within the coverage area of the radio communication system 100 and therefore change geographic locations within the coverage area. A more detailed description of a communication unit 120 is presented below.

The system support infrastructure 110 includes a system controller 113, a database 114, a user control module 112, and a plurality of base stations 117. The base stations 117 comprise radio transceivers which operate communicating over a wireless radio frequency link to the communication units 120 of the system. Ordinarily, the base stations 117 are organized to support a plurality of channels. The channels include a control channel for the communication of control information between the communication units 120 and the system controller 113, and voice and/or data channels to support general communications.

The base stations 117 are coupled to the system controller 113 through wire or wireless links. The system controller 113 performs management functions for the radio communication system 100 including resource allocation, communications routing, base station coordination, access control, and the like. The system controller 113 can be implemented using a Motorola Smart Zone Controller, which includes a computational platform operating in a well-known manner. As is typical in the art, the system support infrastructure 110 includes a user control module 112 and a database 114. The system controller 113 is coupled to the user control module 112 and the database 114. The user control module 112 provides an operator with an interface to the system infrastructure support. The database 114 contains critical information needed by the system controller 113 to manage communications within the system. Such information typically includes communication unit identifier, associated talkgroups, access control information, and other management information.

According to the present invention, the database 114 also includes geographically based talkgroup definitions. In the preferred embodiment, the geographically based talkgroup comprises a defined geographic area, or subregion, and associated talkgroup identification information. One or more talkgroups may be associated with a particular subregion. This talkgroup definition information is stored in the database 114 as an associative list 115 of talkgroup identifiers, and geographic parameters defining a specific area. The geographic parameters typically include information describing the absolute location and boundaries of a subregion. The information may contain coordinates such as longitude, latitude, and altitude parameters, in a variety of formats. Preferably, the subregion is contained within, or is a subset of, the coverage area of the radio communication system 100. The system controller 113 also interfaces with a user control module 112 which is used in part to define subregions and associated talkgroups.

Figure 2:
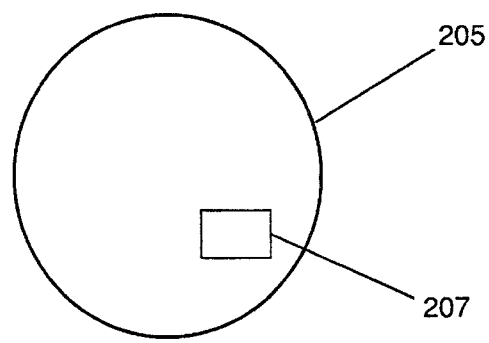
FIG. 2 is a graphical depiction of a system coverage area, representing a first area of operation, and a geographically defined area within the coverage area, representing a second area of operation, in accordance with the present invention.

FIG. 2 is a graphical depiction of the coverage area 205 and a geographically defined area or subregion 207 within the coverage area 205, in accordance with the present invention. The coverage area 205 represents a first area of operation within which the radio communications system operates. The subregion 207 represents a second area of operation is defined by geographic parameters which is smaller than, and contained within, the first area of operation.

Figure 3:
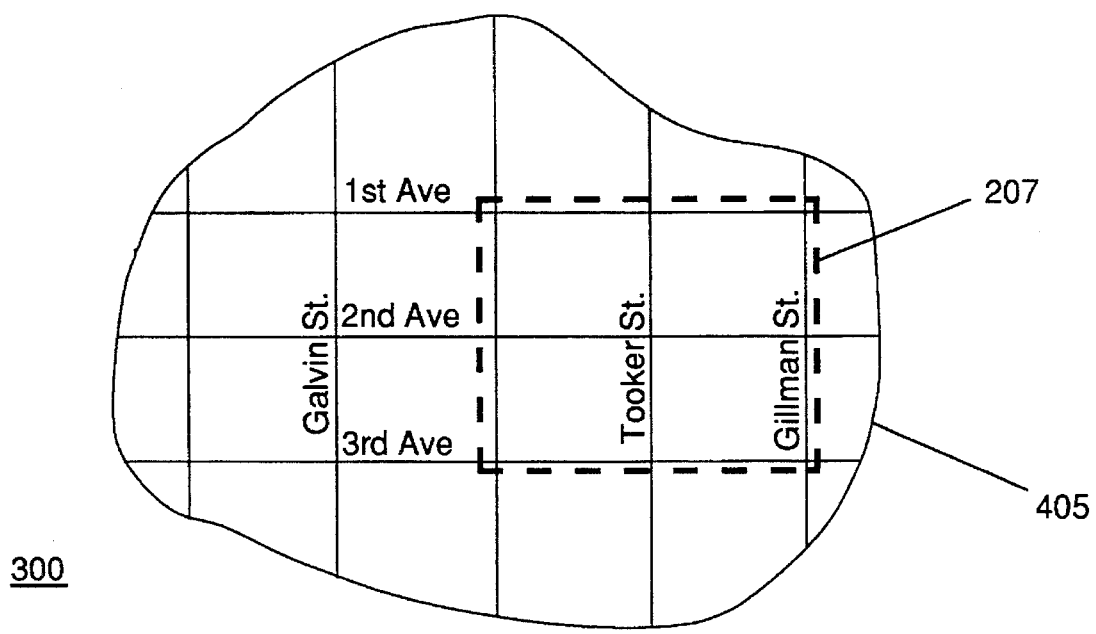
FIG. 3 is a fragmentary view of a user control module display showing a potential definition for the second area of operation, in accordance with the present invention.

FIG. 3 is a fragmentary view of a user control module display 300 depicting how the second area of operation 207, may be defined using the user control module 112. A portion of a map 405 is presented showing a grid of several streets and avenues. The particular second area of operation 207 has been defined as a subset of the map 405 which incorporates selected streets and avenues. The user control module 112 can be implemented using a map display device, wherein the user may select and define a subregion by indicating a specific area of the map using a pointing device, a keyboard, or other appropriate input device. With the subregion defined, the user control module 112 is used to associate a talkgroup identifier. After the user definitions are completed, the system controller 113 receives the user input that defines the second area of operation, and the associated talkgroup identification information and this information is stored in the database 114.

Figure 4:
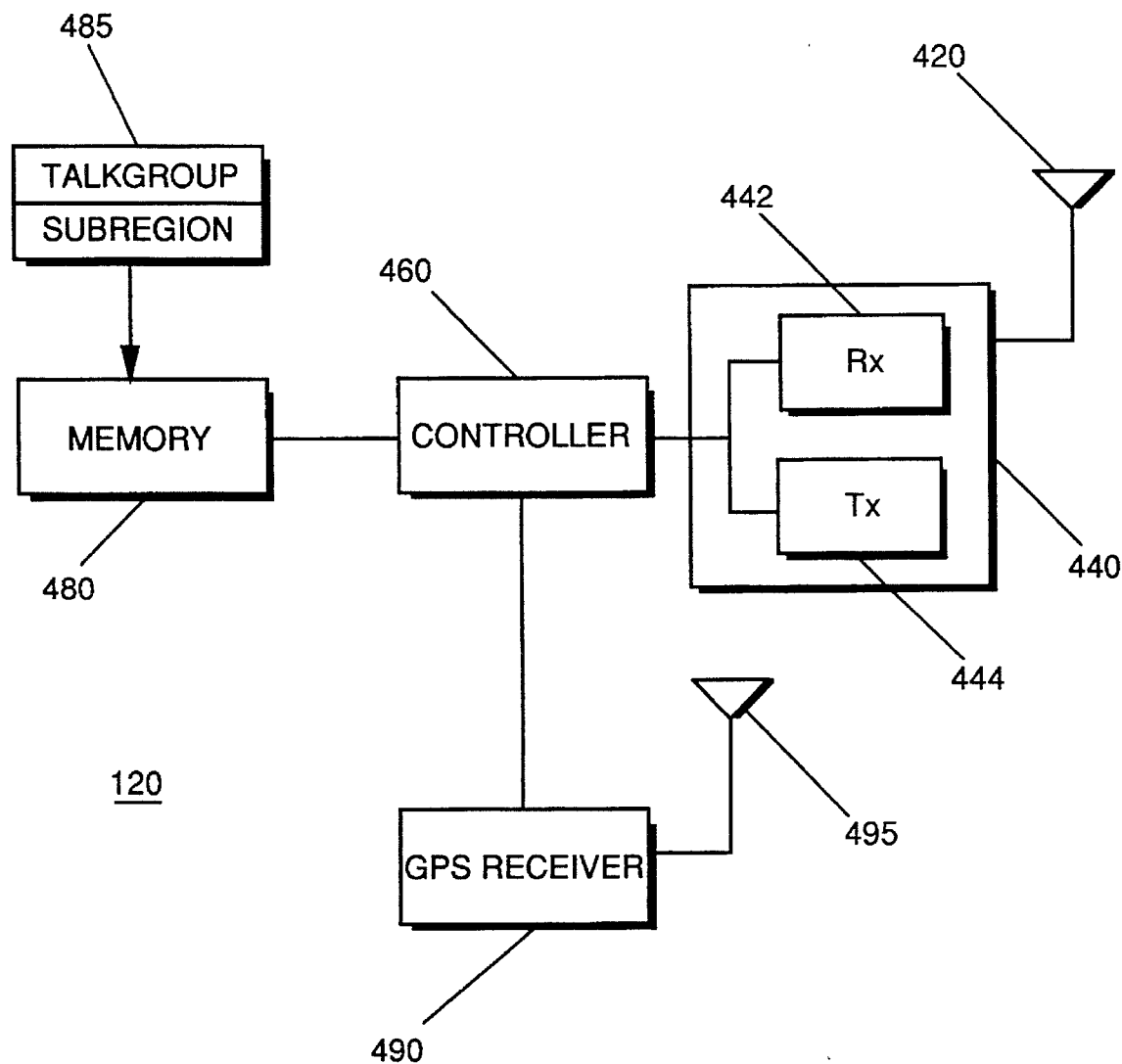
FIG. 4 is a block diagram of a communication unit in accordance with the present invention.

FIG. 4 shows a block diagram of a communication unit 120 in accordance with the present invention. Preferably, the communication unit 120 is a two-way mobile or portable radio, capable of receive and transmit operations using well known principles. A controller 460 uses logic and other information from an electrically coupled memory portion 480 to control the overall operation of the communication unit 120. The controller 460 is electrically coupled to an transceiver portion 440 which includes a receiver 442 and a transmitter 444. The transceiver portion 440 is electrically coupled to an antenna 420. For receive operations, communication signals are received by the antenna 420 and are selectively processed by the receiver 442. Similarly, for transmit operations, communication signals are processed by the transmitter 444 and radiated through the antenna 420. The transmitter 444 and receiver 442 operate under the control of the controller 460. The communication unit also includes a global positioning system (GPS) receiver 490 coupled to a GPS antenna 495, for receiving a signal indicating present location information, in a manner well known in the art. The GPS receiver 490 is coupled to, and is under the control of, the controller 460. According to the invention, the controller 460, cooperates with the memory portion 480, the GPS receiver 490, and the transceiver portion 440, to perform the geographically based automatic selection of talkgroup described herein.

The communication unit uses the signal received by the GPS receiver 390 to determine present location and to initiate automatic selection of a talkgroup when the present location corresponds to a particular geographically defined subregion. In one embodiment, the memory portion 480 includes an internal database 485 containing a list of associations for talkgroup and subregion or geographically defined areas. With the internal database 485, the communication unit 120 can compare present location with information derived from the database 485 to determine talkgroup selection.

According to the invention, there is provided a plurality of wireless two-way communication units capable of communicating with one another within a first area of operation. When operating within a particular second area of operation, which second area of operation is smaller than, and contained within, the first area of operation, a particular member of the plurality of communication units is caused to automatically operate as a member of a particular talkgroup. Thus, particular members of the plurality of wireless two-way communication units are grouped into a common talkgroup when those particular members are within the particular second area of operation.

Figure 5:
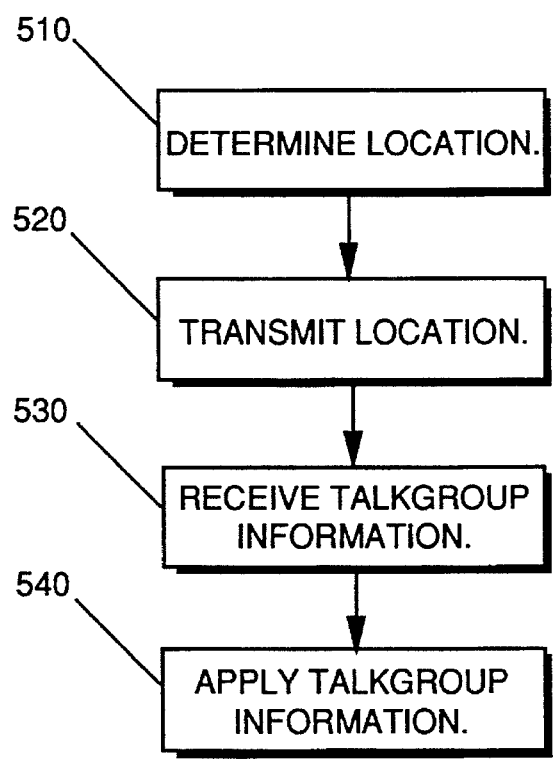
FIG. 5 is a summary of procedures used by a communication unit in the talkgroup selection process, in accordance with the present invention.
Figure 6:
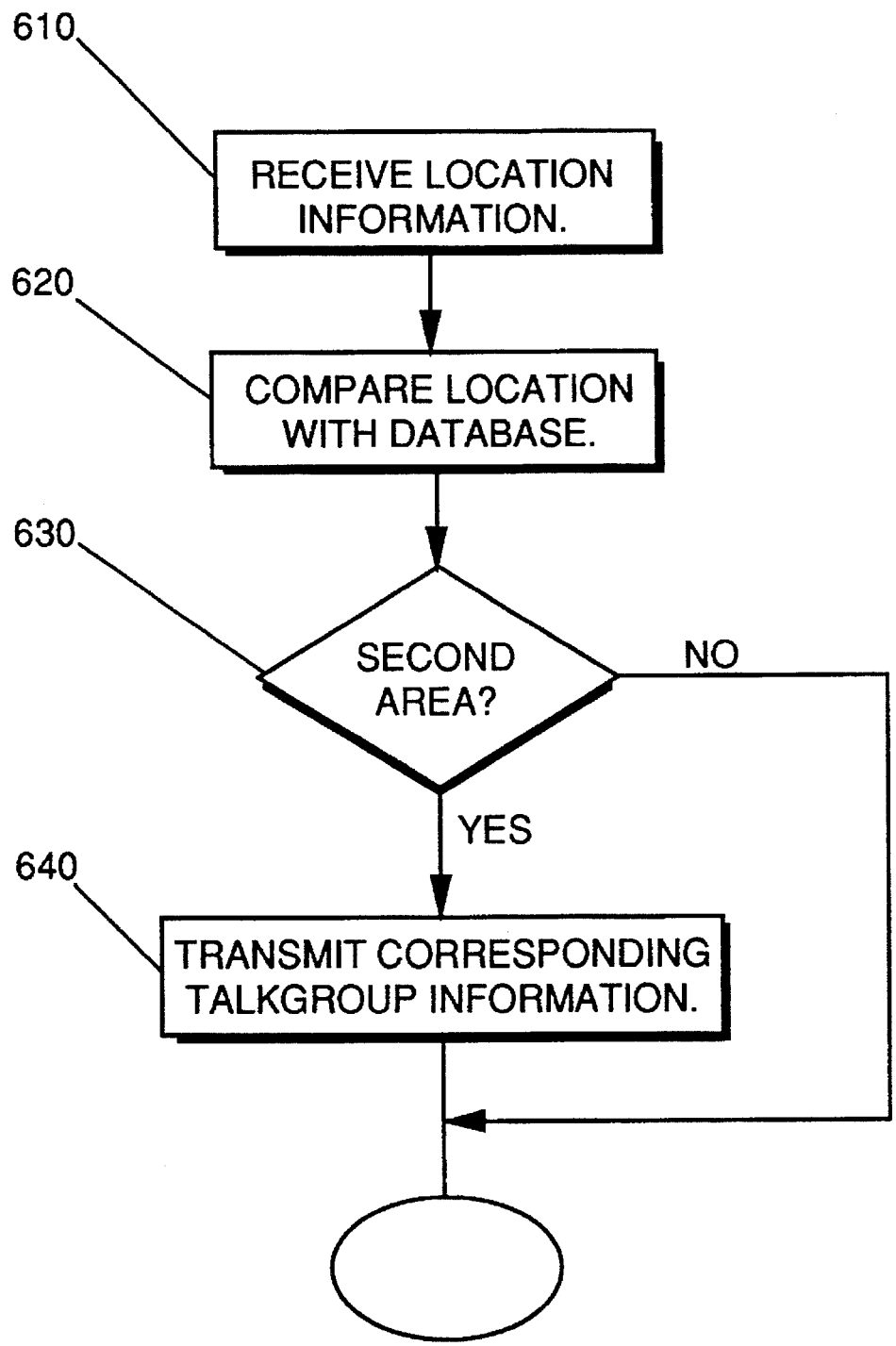
FIG. 6 is a summary of procedures used by a system controller to respond to present location information transmitted by the communication unit, in accordance with the present invention.

FIG. 5 is a summary of procedures used by a communication unit 120 in the talkgroup selection process. The communication unit 120 determines its present location, step 510. Information needed to determine the present location is typically obtained from a source external to the radio communication system. In the preferred embodiment, the communication unit 120 receives information from a global positioning system using a receiver for that purpose. Position parameters are determined based on the information received from the global positioning system and a present location is derived. The present location of the communication unit 120 is used to determine when the particular communication unit 120 is within a particular second area of operation. Preferably, the communication unit 120 transmits the present location to the system controller 113, step 520. FIG. 6 is a summary of procedures used by the system controller 113 to respond to present location information transmitted by the communication unit 120. The system controller 113 receives the location information, step 610, and compares the present location of the communication unit 120 with information stored in the database, step 620. If the present location indicates that the communication unit 120 is physically located in the second area of operation, step 630, the system controller 113 transmits corresponding talkgroup information back to the communication unit 120, step 620, which talkgroup information is common to communication units in the second area of operation. Referring back to FIG. 5, the communication unit 120 receives the talkgroup information, step 530, and applies the talkgroup information to its communication operations, step 540.

Figure 7:
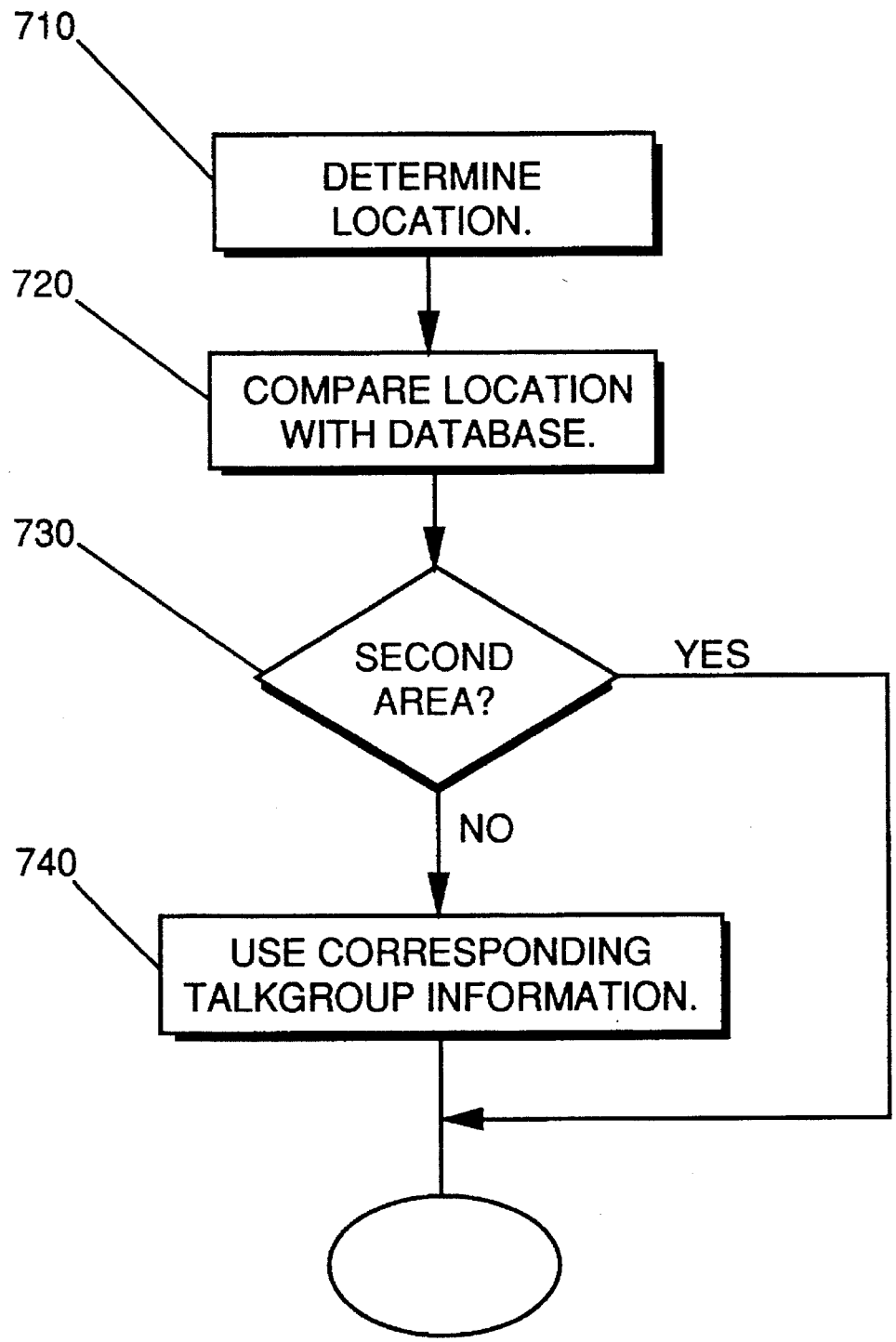
FIG. 7 is a second embodiment of procedures which may be used by the communication unit, in accordance with the present invention.

FIG. 7 is a second embodiment of procedures which may be used by the communication unit 120, in accordance with the present invention. The communication unit 120 determines the present location as before, step 710. The communication unit 120 then compares the present location with parameters defining a geographic area, which parameters are stored in an internal database directly accessible by the communication unit 120, step 720. When the present location indicates that the communication unit 120 is within the second area of operation, step 730, the communication unit 120 uses the corresponding talkgroup information in its communication operations, step 740. Thus, the communication unit 120 retrieves talkgroup identification information from the internal database that corresponds to the second area of operation and transmits the talkgroup identification information to the system controller 113.

The present invention provides several advantages over the prior art. The automated process of dynamically regrouping communication units into talkgroups based on precisely defined geographic boundaries is very useful in several situations. Sophisticated geographic area definitions can be formed to meet the needs of a given situation and therefore provide greater flexibility than talkgroup definition procedures currently available in the prior art. Using geographic talkgroup affiliations, the potential of missed talkgroup reassignments, or inadvertent talkgroup inclusion or exclusion can be minimized.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method comprising the steps of:

providing a plurality of wireless two-way communication units capable of communicating with one another within a first geographic area of operation; and automatically causing a particular member of the plurality of wireless two-way communication units to operate as a member of a particular talkgroup when that particular member is within a particular second geographic area of operation identified by specific geographic parameters, which second geographic area of operation is smaller than, and contained within, the first geographic area of operation.

2. The method of claim 1, further including the step of receiving user input that defines the second geographic area of operation.

3. The method of claim 1, wherein the step of causing a particular member of the plurality of wireless two-way communication units to operate as a member of a particular talkgroup includes the step of automatically causing the particular member to operate as a member of a particular talkgroup when that particular member is within a particular second geographic area of operation.

4. The method of claim 1, wherein the step of causing a particular member of the plurality of wireless two-way communication units to operate as a member of a particular talkgroup includes the steps of:

determining a present location of the particular member; and using the present location of the particular member to determine when the particular member is within the particular second geographic area of operation.

5. The method of claim 4, wherein the step of using the present location includes the step of providing, by the particular member, the present location of the particular member to a system controller.

6. The method of claim 5, wherein the step of causing a particular member of the plurality of wireless two-way communication units to operate as a member of a particular talkgroup further includes the step of receiving from the system controller information regarding the particular talkgroup.

7. The method of claim 4, wherein the step of causing a particular member of the plurality of wireless two-way communication units to operate as a member of a particular talkgroup further includes the step of receiving from a system controller information regarding the particular talkgroup.

8. A method comprising the steps of:

providing a plurality of wireless two-way communication units capable of communicating with one another within a first geographically defined area of operation; and grouping particular members of the plurality of wireless two-way communication units into a common talkgroup when particular members are within a particular second geographically defined area of operation identified by specific geographic parameters, which second geographically defined area of operation is smaller than, and contained within, the first geographically defined area of operation.

9. The method of claim 8, further including the step of receiving user input that defines the second geographically defined area of operation.

10. The method of claim 8, wherein the step of grouping includes the steps of:

determining present locations of the particular members; and using the present locations of the particular members to determine when the particular members are within the particular second geographically defined area of operation.

11. The method of claim 10, wherein the step of using the present locations includes the step of providing the present locations of the particular members to a system controller.

12. The method of claim 11, wherein the step of grouping further includes the step of providing, by the system controller, information regarding the common talkgroup to the particular members.

13. The method of claim 11, wherein the step of providing the present locations includes the steps of:

receiving information from a global positioning system; and determining position parameters based on information received from the global positioning system.

14. In a radio communication system, a method for automatically selecting a radio talkgroup, the method comprising the steps of:

providing a plurality of wireless two-way communication units capable of communicating with one another within a first geographically defined area of operation;

defining a second geographically defined area of operation, which second geographically defined area of operation is smaller than and contained within the first geographically defined area of operation;

providing talkgroup identification information that corresponds to the second geographically defined area of operation;

determining present locations of the plurality of wireless two-way communication units; and when one of the plurality of wireless two-way communication units is within the second geographically defined area of operation, automatically causing the one communication unit to operate using the talkgroup identification information that corresponds to the second geographically defined area of operation.

15. The method of claim 14, wherein the step of determining present locations includes the steps of:

obtaining, by the one communication unit, present location information from a source external to the radio communication system; and providing, by the one communication unit, present location information to a system controller.

16. The method of claim 15, wherein the step of providing, by the one communication unit, present location includes the steps of:

receiving information from a global positioning system; and determining position parameters based on information received from the global positioning system.

17. The method of claim 15, wherein the step of automatically causing the one communication unit to operate using the talkgroup identification information includes the steps of:

determining when the present location of the one communication unit corresponds to the second geographically defined area of operation;

retrieving, by the one communication unit, particular talkgroup identification information from an internal database that corresponds to the second geographically defined area of operation; and transmitting the particular talkgroup identification information to a system controller.

18. The method of claim 15, wherein the step of automatically causing the one communication unit to operate using the talkgroup identification information includes the steps of:

transmitting, by the one communication unit, the present location information of the one communication unit to a system controller;

receiving, by the one communication unit, particular talkgroup identification information from the system controller; and applying, by the one communication unit, the particular talkgroup identification information to communication operations.

19. A radio communication system having automatic selection of radio talkgroup, comprising:

a database having associations of talkgroup and geographically defined subregions, including an association of a particular talkgroup and a particular geographically defined subregion; and a communication unit having a receiver for receiving a signal indicating a present location of the communication unit;

wherein the communication unit is responsive to the signal received by the receiver, indicating a present location of the communication unit, to initiate automatic selection of the particular talkgroup when the present location corresponds to the particular geographically defined subregion.

20. The radio communication system of claim 19, wherein the receiver is a global positioning system receiver.

21. The radio communication system of claim 20, wherein the database is internal to the communication unit.

* * * * *